A. BIRNBAUM.
ROLLER FOR BARREL SCRUBBERS.
APPLICATION FILED DEC. 21, 1908.
929,379.  Patented July 27, 1909.
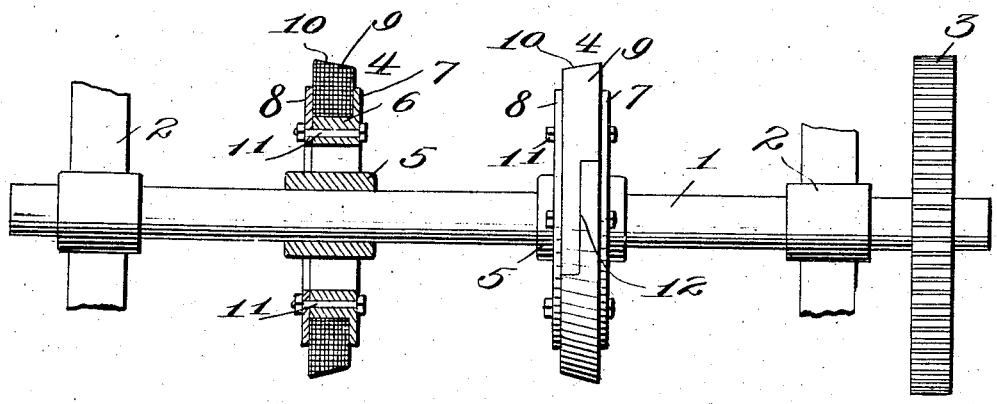
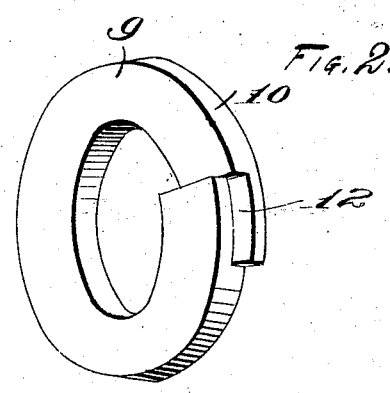
Witnesses
Robert Everett.
C. D. Kesler
Inventor
Anton Birnbaum.
By James L. Norris
Attorney

UNITED STATES PATENT OFFICE.

ANTON BIRNBAUM, OF ERIE, PENNSYLVANIA.

ROLLER FOR BARREL-SCRUBBERS.

No. 929,379.  Specification of Letters Patent.  Patented July 27, 1909.

Application filed December 21, 1908. Serial No. 468,608.

*To all whom it may concern:*

Be it known that I, ANTON BIRNBAUM, a citizen of the United States, residing at Erie, in the county of Erie and State of Pennsylvania, have invented new and useful Improvements in Rollers for Barrel-Scrubbers, of which the following is a specification.

This invention relates to a roller for barrel scrubbers for imparting rotation to barrels during the scrubbing operation.

Heretofore rollers for barrel scrubbers have been constructed with outer frictional rings projected outwardly a considerable distance beyond inclosing flanges and preferably constructed from rubber, rubber compounds, or other suitable material. These outer frictional rings are made continuous and by constant action in connection with barrels become worn and cut by being crowded down on the flanges and have to be replaced. It has been necessary in rollers as heretofore constructed to disengage the roller from the operating shaft to replace a worn outer ring by a new one or to remove the shaft from its bearings in order to disengage the ring from the shaft and apply a new or substitute ring.

The object of the present invention is to overcome these disadvantages by forming a roller for barrel scrubbers with an outer ring which is readily removable both from the roller and the shaft without requiring the latter to be disengaged from its bearings and also to permit the application of a new ring without disturbing the operative association of the shaft with relation to its supporting and driving elements.

The invention consists in the construction and arrangement of parts which will be more fully hereinafter specified.

In the drawing: Figure 1 is an elevation of a shaft shown mounted in bearings and provided with a driving device and having rollers thereon embodying the features of the invention, one of the rollers being shown in section. Fig. 2 is a detail perspective view of the outer ring of the roller and particularly embodying the features of the invention.

The numeral 1 designates a shaft of the usual form of barrel scrubber mounted in suitable supporting bearings 2 and having a driving wheel or gear 3 as shown, though it is obvious that this driving wheel may be modified at will. On the shaft 1 between the supporting bearings 2 barrel rotating rollers 4 are mounted in proper spaced relation, two of these rollers being shown in the present instance. Each roller comprises a hub 5 which is keyed to the shaft 1 in any suitable manner. The hub 5 rigidly carries a rim 6 having a fixed flange 7, and removably applied against the rim is a disk or ring 8 constituting a removable flange and forming with the flange 7 a circumferential seat to removably receive an outer frictional ring 9 formed of rubber, rubber compound or any other material adapted for the purpose and having an outer beveled edge 10 to form a bearing surface for the barrel and to conform in a general way to the longitudinal curvature of a barrel body. The disk or ring 8 is held in removable relation to the rim 6 by bolts or nuts 11 arranged at intervals as shown. The essential feature of the invention resides in the outer frictional ring 9 and consists in forming said ring with a lap joint 12, which in the present instance is shown straight with respect to the length of the roller in relation to each terminal of the latter for a greater portion of the length of the joint so that when the two terminals of the ring produced by cutting the same are joined there will be a flush overlap. When the ring 9 is inserted in the circumferential seat against the rim 6 and flange 7, and the disk or ring 8 is tightened up against the rim, the joint of the said ring will be firmly held by the frictional pressure of the disk or ring 8 acting against the resistance of the flange 7.

In applying the improved outer frictional ring 9, the disk or ring 8 is loosened or disengaged from the rim 6 and the said ring is opened and fitted against the circumferential seat or the rim 6 and flange 7 without requiring dissociation of the shaft 1 from its bearings or a removal of the roller as a whole from the shaft. After the ring is applied the disk 8 is tightened up and the roller is ready for service. Should the ring 9 become worn and unfit for use, it may be readily removed from the roller and replaced by a new ring without disturbing the mounting of the shaft 1 or the parts coöperating with the latter.

The ready application and removal of the outer frictional ring 9 as just explained saves considerable time and annoyance, particularly where a large number of scrubbing machines is used and requires repair in the manner specified. The ring embodying the features of the invention may be readily applied and removed by one person in view of the fact that disconnection of the shaft carrying the roller on which the ring is mounted or operates is unnecessary. In the preparation of the ring 9 for use as a part of the roller, it will be observed that it is only necessary to cut through the body of the ring to provide the lap joint 12 and no complex operation is necessary, as for instance molding or sectioning and joining and it is possible to utilize stock already found in the market or to cut the rings from a rubber cylinder and by a simple subsequent operation bevel the same and form the lap joint entirely through the ring from the inner to the outer periphery. The lap joint extending as shown in relation to the ring is very effectively secured by clamping the disk 8 thereagainst and thus confining the joint between said disk 8 and the flange 7, no other securing means being necessary, as the compression of the disk 8 will result in a practical retention of the extremities of the ring provided by the formation of the joint against movement either radially or laterally and by loosening the disk 8 it is obvious that the ring 9 may be readily separated from the roller.

What is claimed is:

A roller for a barrel scrubbing machine comprising a hub carrying a rim with a fixed flange projecting outwardly at one side beyond the periphery thereof, an annular disk removably applied to the side of the rim opposite that from which the fixed flange projects, and a solid rubber ring having an outer beveled periphery and applied around the rim and held between the fixed flange and disk and removable from the roller by loosening the disk, the ring being cut in a straight line centrally thereof fully through from the inner to the outer periphery and then at right angles in opposite directions to reverse faces of the ring from the terminals of the first cut to form a normally loose lap joint, the ring being separable from the rim by moving the one cut extremity thereof laterally with relation to the other, the ring being compressed between the flange and the disk when the latter is secured to the rim and the lap joint also compressed and retained intact solely by the disk tightly forcing the same against the fixed flange.

In testimony whereof I have hereunto set my hand in presence of two subscribing witnesses.

ANTON BIRNBAUM.

Witnesses:
 CHARLES A. MERTENS,
 ELIZABETH M. SCHMITZ.